United States Patent [19]

Ono

[11] Patent Number: 5,046,666

[45] Date of Patent: Sep. 10, 1991

[54] METERING DISPENSER WITH SCREW PUMP

[75] Inventor: Tuneo Ono, Nagata, Japan

[73] Assignee: Heishin Sobi Kabushiki Kaisha, Kobe, Japan

[21] Appl. No.: 355,295

[22] Filed: May 22, 1989

Related U.S. Application Data

[63] Continuation-in-part of Ser. No. 45,019, Apr. 30, 1987, abandoned.

[30] Foreign Application Priority Data

May 15, 1986 [JP] Japan .............................. 61-112378

[51] Int. Cl.⁵ .............................................. B05B 12/00
[52] U.S. Cl. .................................. 239/73; 239/119; 239/332; 901/43
[58] Field of Search .............. 239/62, 73, 119, 226, 239/227, 264, 269, 284, 104, 332; 418/48; 901/9, 43; 137/47, 50, 51

[56] References Cited

U.S. PATENT DOCUMENTS

| | | | |
|---|---|---|---|
| 2,800,365 | 7/1957 | Hodges | 239/119 |
| 3,313,398 | 4/1967 | Andrews | 198/675 X |
| 3,465,685 | 9/1969 | Sherrod | 198/675 X |
| 3,580,389 | 5/1971 | Nonnenmacher | 198/675 X |
| 3,792,709 | 2/1974 | Johnson | 137/47 |
| 3,902,665 | 9/1975 | Hendry | 239/119 |
| 4,173,430 | 11/1979 | Kubota | 417/53 |
| 4,591,322 | 5/1986 | Ono et al. | 418/48 |
| 4,640,663 | 2/1987 | Niinomi | 901/9 X |
| 4,659,018 | 4/1987 | Shulman | 239/264 |
| 4,714,196 | 12/1987 | McEachern et al. | 239/62 |
| 4,822,647 | 4/1989 | Nozaki et al. | 901/43 X |

FOREIGN PATENT DOCUMENTS 3216052 11/1983 Fed. Rep. of Germany ........ 418/48

*Primary Examiner*—Andre S. Kashnikow
*Assistant Examiner*—Kevin P. Weldon
*Attorney, Agent, or Firm*—Jones, Tullar & Cooper

[57] ABSTRACT

An improved metering dispenser system for delivering a fixed or variable measured quantity of a high viscosity material such as adhesives or sealants for application to a substrate is disclosed. It uses an Archimedian screw pump having a stator formed with a spiral cavity therethrough, and a spiral rotor which is driven by a variable-speed drive motor. The stator has a nozzle attached to its outlet end, the inlet end thereof being in fluid communication with a reservoir for the material. The dispenser system is adapted for use in combination with a robotic system so that the nozzle is manipulated thereby. The rotational speed of the drive motor is controlled in response to a signal representative of a nozzle velocity so that the nozzle can apply a ribbon of the material with a fixed width to the substrate despite nozzle velocity variations. When the nozzle is about to come to a stop, the drive motor is rotated in a reverse direction so as to cause the nozzle to stop discharging the material instantly.

8 Claims, 2 Drawing Sheets

METERING DISPENSER WITH SCREW PUMP

CROSS REFERENCE TO RELATED APPLICATION

This application is a continuation-in-part application of application Ser. No. 07/045,019, filed Apr. 30, 1987, and now abandoned.

BACKGROUND OF THE INVENTION

The present invention relates to metering dispensers and, more particularly, to an improved dispensing system which is adapted for use in combination with a robot in which a ribbon of high viscosity, high concentration material such as adhesives or sealants can be applied continuously or intermittently to a substrate along a predetermined path.

In FIG. 1, the prior art dispensing system includes a dispensing apparatus 10, a material supply means such as a pressurized tank 12 for holding the material to be applied or dispensed, and a pressurized air tank 14. The dispensing apparatus 10 includes a pneumatically operable valve (not shown) and a nozzle 18 connected thereto. The material to be applied is pumped through a conduit 20 to the dispensing apparatus 10 and the opening of the valve is adjusted by varying the pressure from the air tank 14 so as to maintain the material flow at an appropriate level.

The foregoing arrangement has a number of disadvantages, as follows:

(1) The flow rate of material from the dispenser nozzle is not necessarily proportional to the opening of the valve. Thus the dispenser cannot provide a precise control of the discharge rate;

(2) Bending or elongation of the conduit connecting the pressurised material supply tank and the dispensing apparatus as it moves, will cause an undesirable error or deviation from a predetermined discharge rate;

(3) Refilling the supply tank will necessitate interruption of the dispersion operation, which inconveniences the operator and reduces the efficiency of operation;

(4) When the dispensing apparatus is employed in combination with a robotic system, the material pattern width tends to vary and sometimes increase abruptly as the robot moves, since the robot velocity varies during initial start-up, immediately before making stops and when cornering; and (5) When it is desired to interrupt the dispersion operation, the dispensing apparatus cannot instantly stop discharging the material from the nozzle despite a rapid closure of the valve.

BRIEF SUMMARY OF THE INVENTION

It is a general object of the invention to provide an improved dispensing system which permits a precise and quick control of the material flow rate from the nozzle, and which, when combined with a robotic system, enables an appropriate adjustment of the discharge rate in accordance with the velocity of the nozzle to provide a ribbon of the material with a fixed or variable width.

Accordingly, the present invention resides in a dispensing system for dispensing a controlled quantity of relatively viscous material for application to a substrate, comprising: reservoir means for holding dispensable materials; nozzle means; a screw pump having an inlet port communicating with said reservoir means and an outlet port connected to said nozzle means, said screw pump comprising a stator formed with a spiral cavity and a spiral rotor rotatably disposed within said cavity; a variable speed type drive motor having its drive shaft connected to the rotor of said screw pump; first sensor means for sensing the velocity of said nozzle means and providing a first signal representative of the nozzle speed; and control means responsive to said first signal for controlling the rotational speed of said drive motor is accordance with the nozzle velocity whereby the nozzle delivers a controlled quantity of the material for application to the substrate.

With this arrangement, it is possible to deliver a fixed quantity of the material for application to the substrate by adjusting the material flow rate through the nozzle in accordance with the velocity of the nozzle, so that the rotational speed of the variable speed drive motor is always proportional to the nozzle velocity. Accordingly, where the system is employed in combination with a robotic system, the dispensing system can apply a ribbon of the material having a fixed width along a predetermined path on the substrate. The present dispensing system provides the additional distinct advantage that it can stop discharging the material in a complete and abrupt manner by rotating the servo motor in a reverse direction when the nozzle is about to come to a stop.

BRIEF DESCRIPTION OF THE DRAWINGS

The invention will be better understood from the following detailed description of preferred embodiments of the invention, when taken in conjunction with the accompanying drawings, wherein.

DETAILED DESCRIPTION OF THE PREFERRED EMBODIMENTS

Figure 2:
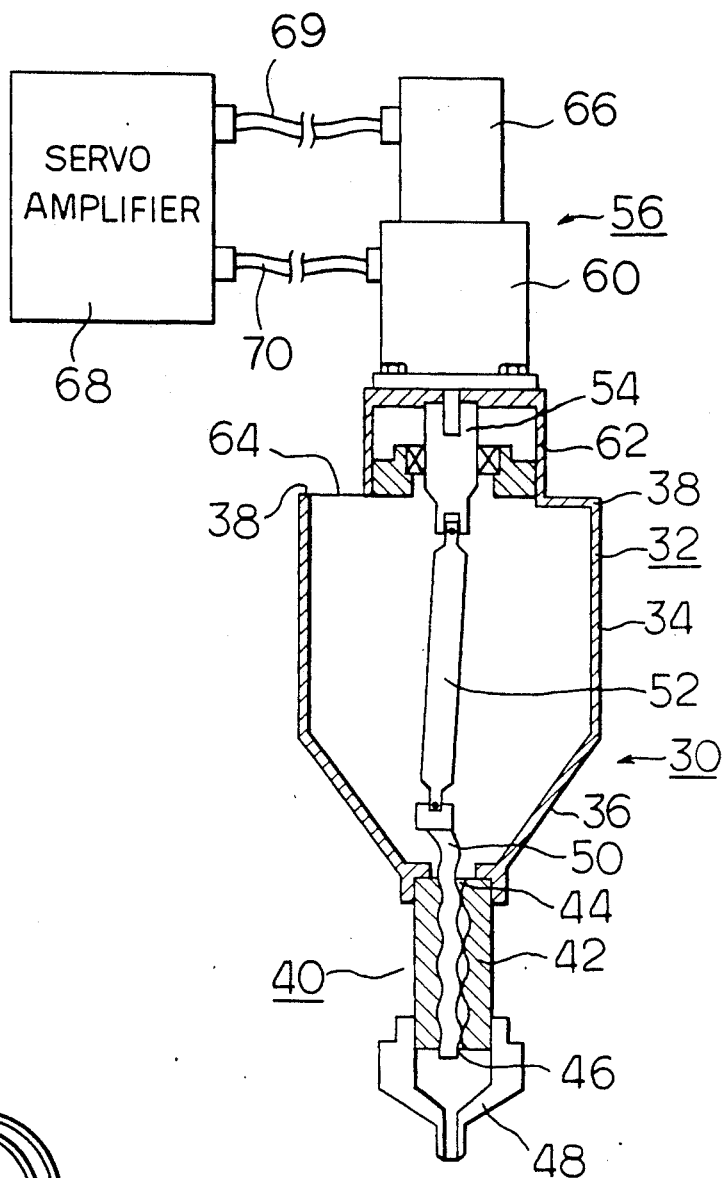
FIG. 2 is a schematic representation of a dispensing system in accordance with a first embodiment of the present invention, showing the dispenser proper in section.

In FIG. 2, there is illustrated a dispensing system as constructed in accordance with a first embodiment of the invention. The system includes a dispenser 30 comprising a body 32 which is comprised of a cylindrical upper portion 34 and an inverted frusto-conical lower portion 36. The cylindrical upper portion 34 has an open upper end 38 and an open lower end which is integrally secured to the upper open end of the body's lower portion. The lower portion 36 also has an open lower end.

Attached to the open lower end of the lower portion 36 is a screw pump 40 which may comprise, for example, a conventional eccentric Archimedian screw pump of rotary displacement type as disclosed in Tuneo Ono et al. U.S. Pat. No. 4,591,322. As shown, the pump assembly includes a stator 42 formed of elastic material such as rubber and having a cavity in the shape of a spiral female thread. The stator 42 has an upper inlet end 44 and a lower outlet end 46. A nozzle 48 is received on the lower outlet end 46 of the stator 42. Nozzles of various kinds can be used interchangeably depending upon the properties of materials to be applied or the configuration of a substrate or workpiece to which the material is applied.

The screw pump 40 also includes a rotor 50 which is in the shape of a spiral male thread and which is in rotatable engagement within the stator's female thread. The spiral rotor 50 is generally circular in cross section and has a pitch which is one-half as large as that of the stator's spiral cavity. The upper end of the spiral rotor 50 is eccentrically and flexibly connected to a rod 52 which may be a conventional flexible shaft which in turn is connected at its upper end to the drive shaft 54 of a drive motor 56.

The drive motor 56 may comprise a conventional variable speed type servo motor and includes a housing 60 which is mounted to a motor support 62. The motor support 62 is integrally secured to the upper end of the body 32. The body serves as a tank for holding the material to be applied and has an inlet opening 64 defined by the motor support 62 and the upper, peripheral end of the body 32. Provided on the motor housing 60 is a rotary encoder 66 for sensing the rotational speed of the drive motor 56 and providing an electric signal representative thereof. The motor speed representative signal is supplied from the rotary encoder to a servo amplifier 68 by way of a line 69 and in response to the electric signal, the amplifier 68 sends a control signal to the servo motor 56 through another line 70.

In operation, the body 32 is first filled with the material to be applied via the inlet opening 64. The servo motor 56 is then activated to rotate the drive shaft 54 at a predetermined speed. This will cause a rotation of the rotor 50 within the spiral cavity of the stator 42 so that the material to be applied is sucked into the cavity through the inlet end 44 and discharged to a substrate (not shown) through the nozzle 48.

Figure 3:
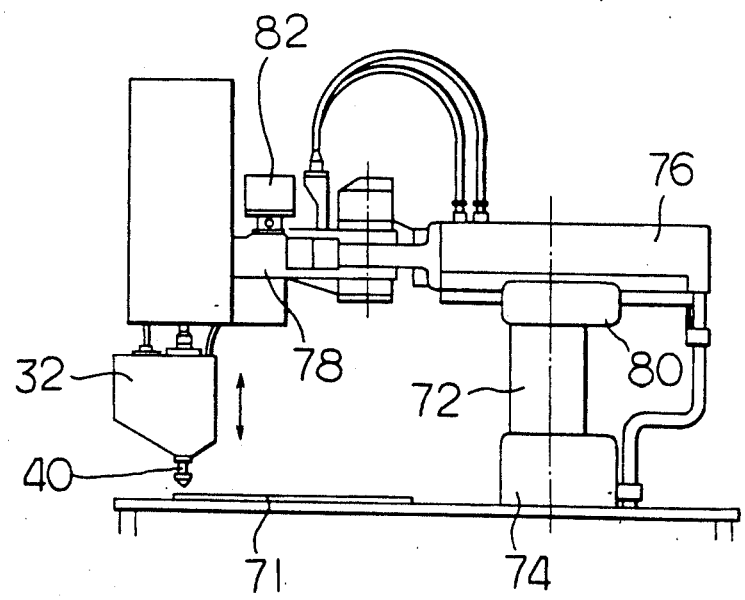
FIG. 3 is a schematic representation of a robotic dispensing system incorporating the dispenser shown in FIG. 2.

FIG. 3 illustrates a typical example of how the present dispensing system is employed in combination with a robotic system. The dispensing system is adapted to deliver a fixed or variable measured quantity of a high viscosity, high concentration material such as adhesives or sealants for application to a substrate or workpiece 71. The workpiece is positioned within the work envelope of the robotic system and can be placed into position by a conveyor means or the like. The robotic system includes a main column 72 which is secured to the work area by means of a base member 74. The robotic system also includes a first arm 76 rotatably and pivotally mounted with respect to the base member 74 and a second arm 78 rotatably mounted about one end of the first arm 76. The first and second arms are independently rotatable by the action of drive means 80 and 82, respectively, in response to commands from a preprogrammed robotic controller (not shown). As shown, the present dispensing system is fixedly attached to the cantilevered end of the second arm 78 for manipulation thereby.

The present dispensing system is manipulated through independent control of the first and second arms 76 and 78 in such a manner that the nozzle 48 follows a predetermined path on the workpiece 71 for application of the material thereto. During such manipulation, it will be appreciated that the nozzle 48 has a tendency to vary its velocity as it moves along the predetermined path, because the path usually comprises a combination of linear and curved portions. The robotic controller serves to generate and feed commands to the drive means 80 and 82 for the first and second arms 76 and 78, respectively. Accordingly, the velocity of the nozzle 48 can be determined based on such commands from the robotic controller. In this embodiment, the robotic controller has the additional function of calculating the nozzle velocity and providing an electric signal representative thereof to the servo amplifier 68. By so doing, the dispensing system can deliver a desired quantity of the material with high accuracy and apply the material to the workpiece along the predetermined path. The rotary encoder 66 provides a feedback of the sensed motor speed to the servo amplifier to check if the speed is equal to the command velocity of the nozzle from the robotic controller.

Figure 4:
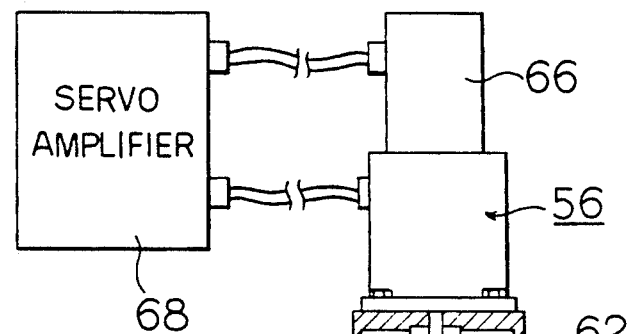
FIG. 4 is a view similar to FIG. 2, showing a second embodiment of the present invention.
Figure 1:
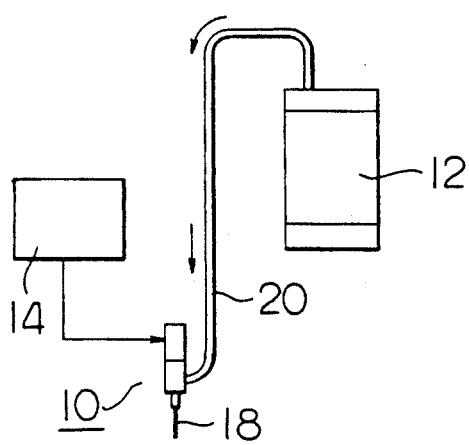
FIG. 1 is a schematic representation of the prior art dispensing system incorporating a pressurized material supply tank.
Figure 5:
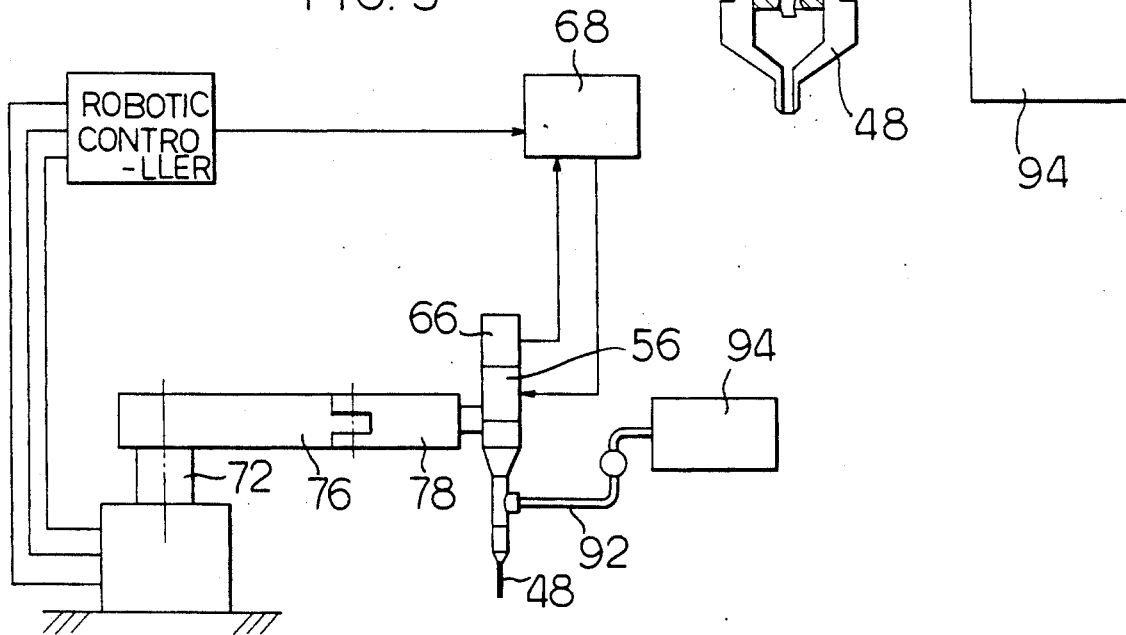
FIG. 5 is a schematic representation of a robotic dispensing system incorporating the dispenser shown in FIG. 4.

FIG. 4 is a schematic view showing a second embodiment of the dispensing system according to the present invention. In this figure, like reference numerals designate like components or parts in the embodiment of FIG. 2. This embodiment differs from the first embodiment in that the body 32 comprises a straight cylinder of a diameter smaller than that of the former embodiment and that the motor support 62 completely covers the open upper end of the body 32 and has an inlet opening 90 into which a conduit 92 connecting the dispenser and a material supply tank 94 extends sealingly. The dispensing system in this embodiment provides the distinct advantage over the first one that it can apply the material at various angles to a substrate and even to an overhead surface without fear of the material spilling from the body, as the dispenser is completely of the closed type. FIG. 5 is a schematic view showing the manner in which the dispensing system in the second embodiment is incorporated into a conventional robotic system. In this figure also, like reference numerals indicate like components or parts in the embodiment of FIGS. 2 and 4.

The dispensing system of the present invention provides several unique advantages over the apparatuses heretofore available:

(1) The use of an eccentric Archimedian screw pump to control the material flow rate in place of an outlet valve in the prior art systems provides a materials supply system capable of precise and quick control of the material to be applied, as the rotational speed of the rotor of the screw pump is controlled by a variable speed type servo motor. Particularly, when employed in combination with a robotic system, the present dispensing system can always deliver a fixed quantity of the material for application to a workpiece despite nozzle speed variations.

(2) The present dispensing system can apply a ribbon of material having a fixed width to a substrate by delivering a fixed amount of the material from the nozzle, as described above. The pattern width of the ribbon can be varied as desired while maintaining the robot velocity at a constant speed.

(3) There are no restrictions in the passage of material from a material supply tank to the discharge nozzle that constrict the flow of the material as done by conventional valves in the prior art systems. This will allow the use of latex or synthetic resin materials as the material to be applied, without affecting the properties thereof.

(4) By rotating the servo motor in a reverse direction when stopping the dispersion operation, it is possible to completely and instantly stop the nozzle from discharging material in a manner not to cause dripping.

(5) The present dispensing system may find utility in other applications where it can be used to fill a number of containers with a fixed amount of material other than adhesives or sealants.

The high viscosity material metered may be, as noted above, adhesive or sealants with a centipoise value (cp) of 100,000 to 1,500,000, respectively. Other materials which can be metered have lower centipoise values. For example heavy oil and automotive engine oil having a 10,000 cp.

Numerous features and advantages of the invention have been set forth in the foregoing description, together with details of structure and function of the invention. The disclosure, however, is illustrative only, and changes may be made in detail without deviating from the true scope of the invention.

What is claimed is:

1. The combination of a dispensing system for dispensing a controlled quantity of a high viscosity material for application to a substrate, and a robotic system used therewith, comprising:

reservoir means for holding the high viscosity material;

nozzle means adapted to be manipulated by the robotic system in response to commands generated thereby;

a screw pump having an inlet port communicating with said reservoir means and an outlet port connected to said nozzle means, said screw pump comprising a stator formed with a spiral cavity and a sprial rotor rotatably disposed within said cavity;

a variable speed type drive motor having its drive shaft connected to the rotor of said screw pump;

means responsive to said commands for determining the velocity of said nozzle means and providing a first signal representative of the velocity of the nozzle means;

sensor means for sensing the rotational speed of said drive motor and providing a second signal representative of the motor speed;

means responsive to said first signal for providing a third signal representative of a desired motor speed; and means responsive to said second and third signals for providing a motor drive signal supplied to said drive motor, whereby the nozzle means delivers a controlled quantity of the high viscosity material as it moves over the substrate.

2. The combination as set forth in claim 1 wherein the rotational speed of said drive motor is controlled to be proportional to the velocity of the nozzle so that said nozzle means delivers a fixed quantity of the high viscosity material despite variations in the velocity of the nozzle means.

3. The combination as set forth in claim 1 further comprising means for rotating said drive motor in a reverse direciton when said nozzle means is about to come to a stop.

4. The combination as set forth in claim 1 wherein the cavity of said screw pump stator is generally oval in cross section, said pump rotor is generally circular in cross section, the pitch of said spiral rotor being ½ of that of said spiral stator cavity, said pump drive shaft being flexibly connected to said drive motor.

5. The combination as set forth in claim 1 wherein said reservoir means comprises a generally cylindrical body having an inlet port open to the atmosphere, through which the high viscosity material is filled into said body.

6. The combination as set forth in claim 1 wherein said reservoir means comprises a generally cylindrical body having an inlet port connected to a conduit leading to a storage means for holding the high viscosity material, said body, conduit and storage means forming a closed system.

7. The combination as set forth in claim 1 wherein the high viscosity material has a value of at least 10,000 cp.

8. The combination as set forth in claim 1 wherein the high viscosity material comprises adhesives and sealants having a value of 100,000 cp and 1,500,000 cp, respectively.

* * * * *